(12) United States Patent
Grawrock et al.

(10) Patent No.: US 7,392,415 B2
(45) Date of Patent: Jun. 24, 2008

(54) SLEEP PROTECTION

(75) Inventors: David W. Grawrock, Aloha, OR (US); David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 10/185,887

(22) Filed: Jun. 26, 2002

(65) Prior Publication Data

US 2004/0003273 A1    Jan. 1, 2004

(51) Int. Cl.
   *G06F 1/32* (2006.01)
(52) U.S. Cl. .................. 713/323; 713/191; 713/193
(58) Field of Classification Search ............... 713/193, 713/191, 323; 726/34, 36, 22, 23, 25
   See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |

(Continued)

FOREIGN PATENT DOCUMENTS

DE    4217444    12/1992

(Continued)

OTHER PUBLICATIONS

Heinrich, J., "MIPS R4000 Microprocessor User's Manual," Apr. 1, 1993, MIPS, MT. VIEW, XP002184449, pp. 61-97.

(Continued)

*Primary Examiner*—Ellen Tran
(74) *Attorney, Agent, or Firm*—Thmas R. Lane

(57) ABSTRACT

Methods, apparatus and machine-readable medium are described that attempt to protect secrets from sleep attacks. In some embodiments, the secrets are encrypted and a security enhanced environment dismantled prior to entering a sleep state. Some embodiments further re-establish a security enhanced environment and decrypt the secrets in response to a wake event.

23 Claims, 4 Drawing Sheets

U.S. PATENT DOCUMENTS

| | | | |
|---|---|---|---|
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,437,033 A | 7/1995 | Inoue et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,533,123 A * | 7/1996 | Force et al. | 713/189 |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,845 A | 8/1998 | Serikawa et al. | |
| 5,805,712 A | 9/1998 | Davis | |
| 5,809,546 A | 9/1998 | Greenstein et al. | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,872,994 A | 2/1999 | Akiyama et al. | |
| 5,890,189 A | 3/1999 | Nozue et al. | |
| 5,901,225 A | 5/1999 | Ireton et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,233,685 B1 * | 5/2001 | Smith et al. | 713/194 |
| 6,249,872 B1 | 6/2001 | Wildgrube et al. | |
| 6,252,650 B1 | 6/2001 | Nakaumra | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |

| | | | |
|---|---|---|---|
| 2001/0018736 | A1* | 8/2001 | Hashimoto et al. ............ 713/1 |
| 2001/0021969 | A1 | 9/2001 | Burger et al. |
| 2001/0027511 | A1 | 10/2001 | Wakabayashi et al. |
| 2001/0027527 | A1 | 10/2001 | Khidekel et al. |
| 2001/0037450 | A1 | 11/2001 | Metlitski et al. |
| 2002/0007456 | A1 | 1/2002 | Peinado et al. |
| 2002/0023032 | A1 | 2/2002 | Pearson et al. |
| 2002/0120843 | A1* | 8/2002 | Goodman et al. ........... 713/164 |
| 2002/0147916 | A1 | 10/2002 | Strongin et al. |
| 2002/0166061 | A1 | 11/2002 | Falik et al. |
| 2002/0169717 | A1 | 11/2002 | Challener |
| 2003/0018892 | A1 | 1/2003 | Tello |
| 2003/0074548 | A1 | 4/2003 | Cromer et al. |
| 2003/0115453 | A1 | 6/2003 | Grawrock |
| 2003/0126442 | A1 | 7/2003 | Glew et al. |
| 2003/0126453 | A1 | 7/2003 | Glew et al. |
| 2003/0159056 | A1 | 8/2003 | Cromer et al. |
| 2003/0188179 | A1 | 10/2003 | Challener et al. |
| 2003/0196085 | A1 | 10/2003 | Lampson et al. |

FOREIGN PATENT DOCUMENTS

| | | |
|---|---|---|
| EP | 0473913 | 3/1992 |
| EP | 0600112 | 8/1994 |
| EP | 0600112 A1 | 8/1994 |
| EP | 0892521 | 1/1999 |
| EP | 0930567 A | 7/1999 |
| EP | 0930567 A3 | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| EP | 1146715 A1 | 10/2001 |
| EP | 1271277 | 1/2003 |
| JP | 02000076139 A | 3/2000 |
| WO | WO9524696 | 9/1995 |
| WO | WO 97/29567 | 8/1997 |
| WO | WO9812620 | 3/1998 |
| WO | WO 98/34365 | 8/1998 |
| WO | WO9834365 A | 8/1998 |
| WO | WO 98/44402 | 10/1998 |
| WO | WO9844402 | 10/1998 |
| WO | WO 99/05600 | 2/1999 |
| WO | WO 99/09482 | 2/1999 |
| WO | WO9905600 | 2/1999 |
| WO | WO9909482 | 2/1999 |
| WO | WO9918511 | 4/1999 |
| WO | 1146715 A1 | 11/1999 |
| WO | WO9957863 | 11/1999 |
| WO | WO99/65579 | 12/1999 |
| WO | WO0021238 | 4/2000 |
| WO | WO 00/62232 | 10/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

"M68040 User's Manual," 1993, Motorola, Inc., pp. 1-20.
"Intel 386 DX Microprocessor 32-Bit CHMOS Microprocessor With Integrated Memory Management," Dec. 31, 1995, Intel, Inc., pp. 32-56; figures 4-14.
Berg, C., "How Do I Create A Signed Applet?," Dr. Dobb's Journal, M&T Publ., Redwood City, CA, US, vol. 22, No. 8, Aug. 1997, pp. 109-111, 122.
Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.
Goldberg, R., "Survey of virtual machine research," IEEE Computer Magazine 7(6), pp. 34-45, 1974.
Gum, P.H., "System/370 Extended Architecture: Facilities for Virtual Machines," IBM J. Research Development, vol. 27, No. 6, pp. 530-544, Nov. 1983.
Rosenblum, M. "Vmware's Virtual Platform: A Virtual Machine Monitor for Commodity PCs," Proceedings of the 11th Hotchips Conference, pp. 185-196, Aug. 1999.
Lawton, K., "Running Multiple Operating Systems Concurrently on an IA32 PC Using Virtualization Techniques," http://www.plex86.org/research/paper.txt; Aug. 9, 2001; pp. 1-31.
"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.
Heinrich, J., "MIPS R4000 Microprocessor User's Manual," 1994, MIPS Technology, Inc., Mountain View, CA, pp. 67-79.
Heinrich, J. "MIPS R4000 Microprocessor User's Manual," Apr. 1, 1993, MIPS, Mt. View, XP002184449, pp. 61-97.
"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.
Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.
Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.
Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.
Brands, Stefan, "Restrictive Blinding of Secret-Key Certificates", *Springer-Verlag* XP002201306, (1995),Chapter 3.
Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989).
Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).
Luke, Jahn, et al., "Replacement Strategy for Aging Avionics Computers", *IEEE AES Systems Magazine*, XP002190614,(Mar. 1999).
Menezes, Oorschot, "Handbook of Applied Cryptography", *CRC Press LLC*, USA XP002201307, (1997),475.
Richt, Stefan, et al., "In-Circuit-Emulator Wird Echtzeittauglich", *Elektronic*, Franzis Verlag GMBH, Munchen, DE, vol. 40, No. 16, XP000259620,(100-103),Aug. 6, 1991.
Saez, Sergio, et al., "A Hardware Scheduler for Complex Real-Time Systems", *Proceedings of the IEEE International Symposium on Industrial Electronics*, XP002190615,(Jul. 1999),43-48.
Sherwood, Timothy, et al., "Patchable Instruction ROM Architecture", *Department of Computer Science and Engineering, University of California*, San Diego, La Jolla, CA, (Nov. 2001).
Coulouris, George, et al., "Distributed Systems, Concepts and Designs", *2nd Edition*, (1994),422-424.
Crawford, John, "Architecture of the Intel 80386", *Proceedings of the IEEE International Conference on Computer Design: VLSI in Computers and Processors (ICCD '86)*, (Oct. 6, 1986),155-160.
Fabry, R.S., "Capability-Based Addressing", Fabry, R.S., "Capability-Based Addressing," *Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i,ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", Wiley, John & Sons, Inc., XP002939871; ISBN 0471117099,(Oct. 1995),47-52.

Schneier, Bruce , "Applied Cryptography: Protocols, Algorithm, and Source Code in C", Wiley, John & Sons, Inc., XP002138607; ISBN 0471117099,(Oct. 1995),56-65.

Schneier, Bruce , "Applied Cryptography: Protocols, Algorithms, and Source Code in C", Wiley, John & Sons, Inc., XP0021111449; ISBN 0471117099,(Oct. 1995),169-187.

Schneier, Bruce , "Applied Cryptography: Protocols, Algorithms, and Source Code in C", 2nd Edition; Wiley, John & Sons, Inc., XP002251738; ISBN 0471128457,(Nov. 1995),28-33; 176-177; 216-217; 461-473; 518-522.

PCT International Search Report from PCT/US 03/19597, date mailed Dec. 9, 2003, 7 pages.

\* cited by examiner

SLEEP PROTECTION

BACKGROUND

Financial and personal transactions are being performed on computing devices at an increasing rate. However, the continual growth of such financial and personal transactions is dependent in part upon the establishment of security enhanced (SE) environments that attempt to prevent loss of privacy, corruption of data, abuse of data, etc. An SE environment may employ various techniques to prevent different kinds of attacks or unauthorized access to protected data or secrets (e.g. social security number, account numbers, bank balances, passwords, authorization keys, etc.). One type of attack that an SE environment may attempt to prevent is a sleep attack.

For example, many computing devices support a suspend-to-memory sleep state such as, for example, the S3 sleep state described in the Advanced Configuration and Power Interface (ACPI) Specification, revision 2.0, 27, Jul. 2000. Upon entering the suspend-to-memory sleep state, the computing device removes power from various components and/or subcomponents of the computing device but continues to power the system memory to retain the contents of the system memory. As a result of removing power, the computing device may remove power from circuitry used to protect secrets stored in the system memory. Upon waking from the sleep state, the computing device may return power to the circuitry used to protect secrets stored in system memory. However, after returning power, the protection circuitry may be in a reset state and may not actually protect secrets in system memory. An attacker may successfully gain access to stored secrets prior to re-establishing the protections provided by the protection circuitry.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

Figure 1:
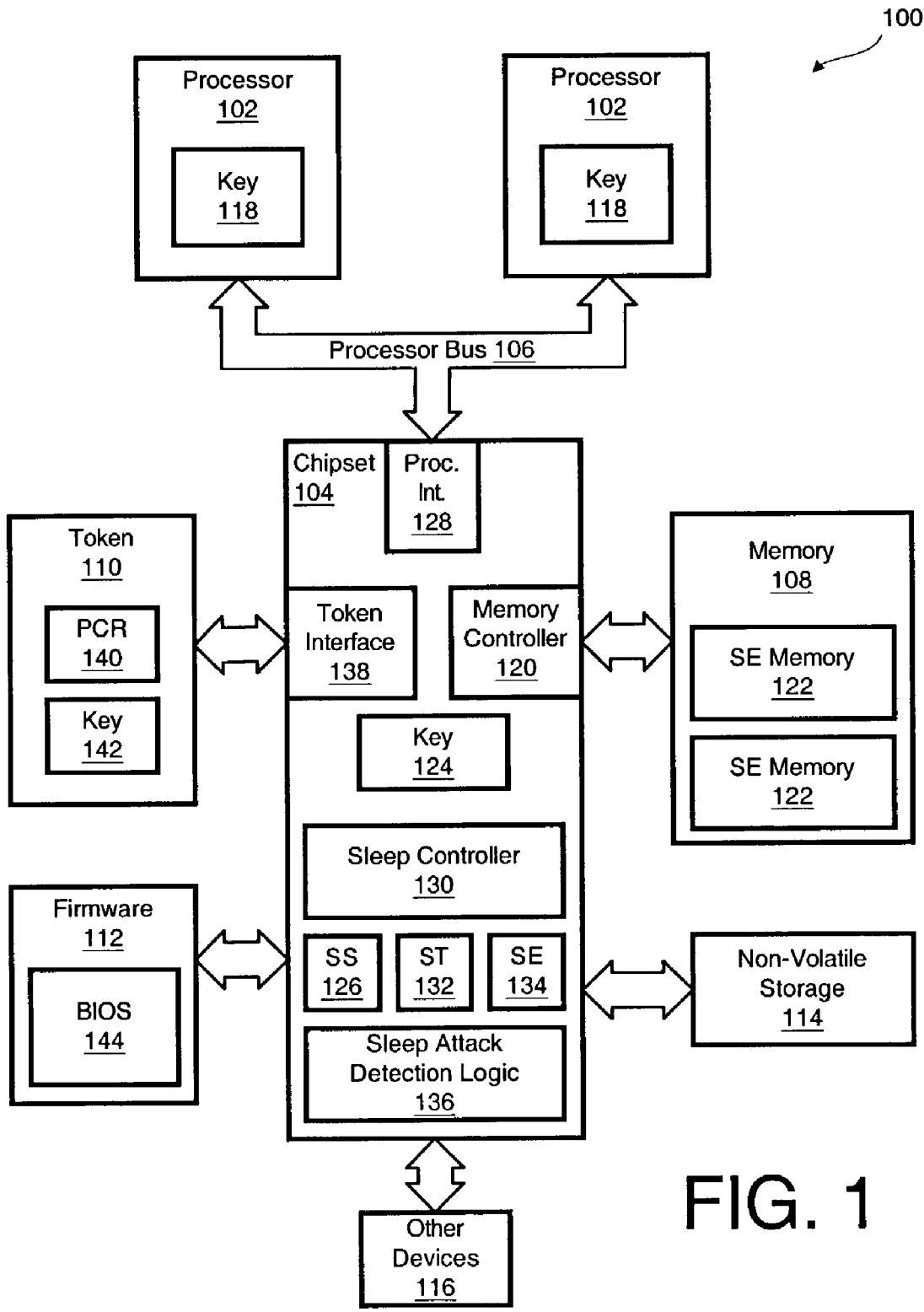
FIG. 1 illustrates an embodiment of a computing device.

The following description describes techniques for protecting secrets from sleep attacks. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

References herein to "symmetric" cryptography, keys, encryption or decryption, refer to cryptographic techniques in which the same key is used for encryption and decryption. The well known Data Encryption Standard (DES) published in 1993 as Federal Information Publishing Standard FIPS PUB 46-2, and Advanced Encryption Standard (AES), published in 2001 as FIPS PUB 197, are examples of symmetric cryptography. Reference herein to "asymmetric" cryptography, keys, encryption or decryption, refer to cryptographic techniques in which different but related keys are used for encryption and decryption, respectively. So called "public key" cryptographic techniques, including the well-known Rivest-Shamir-Adleman (RSA) technique, are examples of asymmetric cryptography. One of the two related keys of an asymmetric cryptographic system is referred to herein as a private key (because it is generally kept secret), and the other key as a public key (because it is generally made freely available). In some embodiments either the private or public key may be used for encryption and the other key used for the associated decryption.

As used herein, the term "object" is intended to be a broad term encompassing any grouping of one or more bits regardless of structure, format, or representation. Further, the verb "hash" and related forms are used herein to refer to performing an operation upon an operand or message to produce a digest value or a "hash". Ideally, the hash operation generates a digest value from which it is computationally infeasible to find a message with that hash and from which one cannot determine any usable information about a message with that hash. Further, the hash operation ideally generates the hash such that determining two messages which produce the same hash is computationally impossible. While the hash operation ideally has the above properties, in practice one way functions such as, for example, the Message Digest 5 function (MD5) and the Secure Hashing Algorithm 1 (SHA-1) generate hash values from which deducing the message are difficult, computationally intensive, and/or practically infeasible.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

An example embodiment of a computing device 100 is shown in FIG. 1. The computing device 100 may comprise one or more processors 102 coupled to a chipset 104 via a processor bus 106. The chipset 104 may comprise one or more integrated circuit packages or chips that couple the processors 102 to system memory 108, a token 110, firmware 112, non-volatile storage 114 (e.g. hard disk, floppy disk, optical disk, flash, programmable read only memory, etc.) and/or other devices 116 (e.g. a mouse, keyboard, video controller, etc.).

Figure 2:
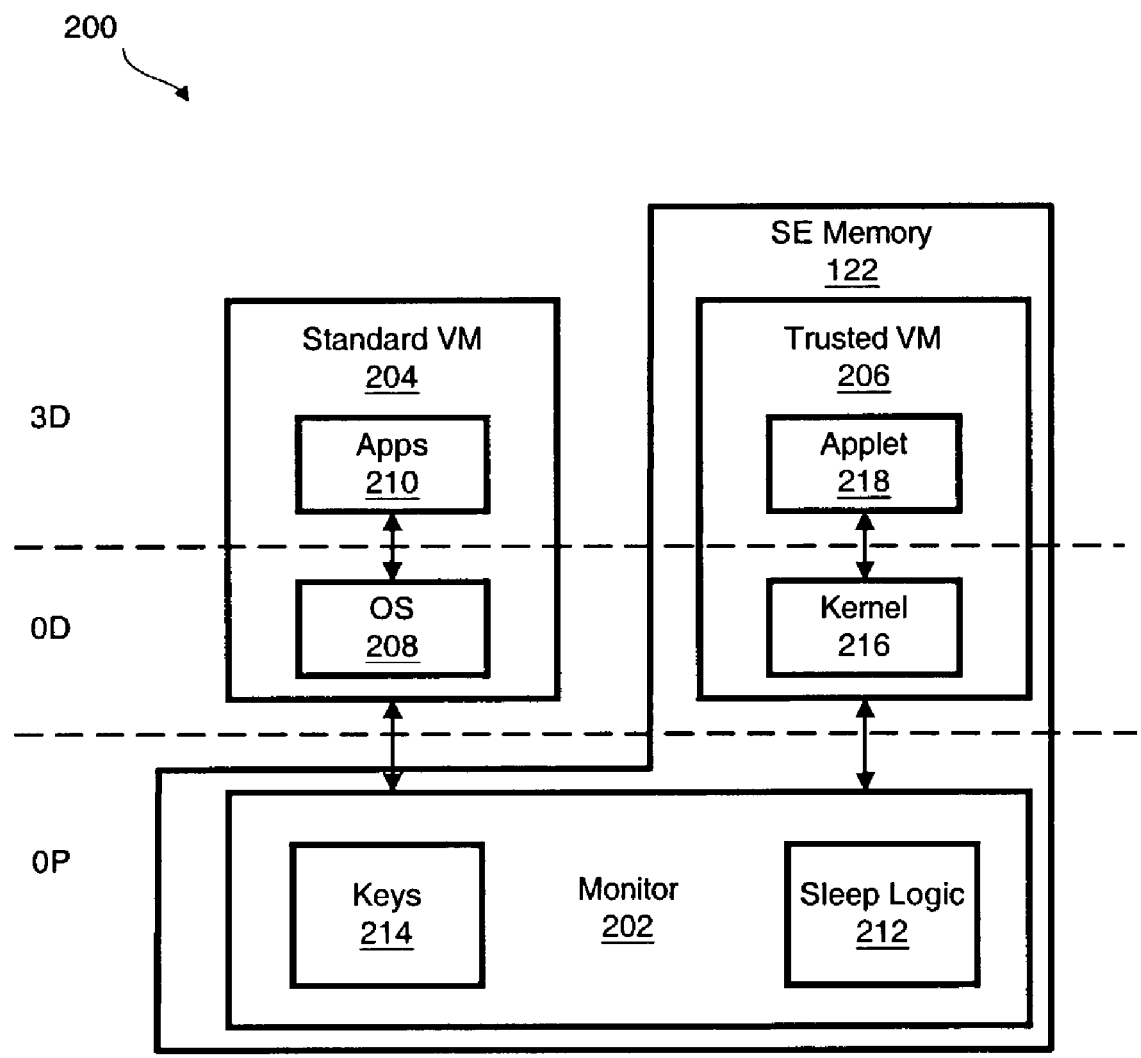
FIG. 2 illustrates an embodiment of a security enhanced (SE) environment that may be established by the computing device of FIG. 1.

The processors 102 may support execution of a secure enter (SENTER) instruction to initiate creation of a SE environment such as, for example, the example SE environment of FIG. 2. The processors 102 may further support a secure exit (SEXIT) instruction to initiate dismantling of a SE environment. In one embodiment, the processor 102 may issue bus messages on processor bus 106 in association with execution of the SENTER, SEXIT, and other instructions.

The processors 102 may further comprise a key 118 such as, for example, a symmetric cryptographic key, an asymmetric cryptographic key, or some other type of key. The processor 102 may use the processor key 118 to authentic an authentic code (AC) module prior to executing the AC module. In one embodiment, the processor key 118 comprises an asymmetric private key to which only the processor 102 has access.

The processors 102 may support one or more operating modes such as, for example, a real mode, a protected mode, a virtual real mode, and a virtual machine mode (VMX mode). Further, the processors 102 may support one or more privilege levels or rings in each of the supported operating modes. In general, the operating modes and privilege levels of a processor 102 define the instructions available for execution and the effect of executing such instructions. More specifically, a processor 102 may be permitted to execute certain privileged instructions only if the processor 102 is in an appropriate mode and/or privilege level.

The chipset 104 may comprise one or more chips or integrated circuits packages that interface the processors 102 to components of the computing device 100 such as, for example, system memory 108, the token 110, non-volatile storage 114, and the other devices 116. In one embodiment, the chipset 104 comprises a memory controller 120. However, in other embodiments, the processors 102 may comprise all or a portion of the memory controller 120. In general, the memory controller 120 provides an interface for components of the computing device 100 to access the system memory 108. Further, the memory controller 120 of the chipset 104 and/or processors 102 may define certain regions of the memory 108 as security enhanced (SE) memory 122. In one embodiment, the processors 102 may only access SE memory 122 when in an appropriate operating mode (e.g. protected mode) and privilege level (e.g. 0P).

Further, the chipset 104 may comprise a key 124 that may be used to authentic an AC module prior to execution. Similar to the processor key 118, the chipset key 124 may comprise a symmetric cryptographic key, an asymmetric cryptographic key, or some other type of key. In one embodiment, the chipset key 124 comprises an asymmetric private key to which only the chipset 104 has access. In another embodiment, the chipset 104 comprises a hash of an asymmetric chipset key 124 stored in another component of the computing device 100. The chipset 104 may retrieve the chipset key 124 and authenticate the key 124 using the hash.

The chipset 104 may further comprise a secrets store 126 to indicate whether the system memory 108 might contain unencrypted secrets. In one embodiment, the secrets store 126 may comprise a flag that may be set to indicate that the system memory 108 might contain unencrypted secrets, and that may be cleared to indicate that the system memory 108 does not contain unencrypted secrets. In other embodiments, the secrets store 126 may be located elsewhere such as, for example, the token 110, the processors 102, or other components of the computing device 100.

In one embodiment, the secrets store 126 is implemented as a single volatile memory bit having backup power supplied by a battery. The backup power supplied by the battery maintains the contents of the secrets store 126 across a system reset, a sleep event, a system shutdown, a system power down, or other power removal/loss event. The chipset 104 may further comprise battery detection circuitry (not shown) to detect an interruption in power supplied by the battery. The circuitry may further update the secrets store 126 to indicate that the system memory 108 may contain secrets in response to detecting a power interruption. In another embodiment, the secrets store 126 is implemented as a non-volatile memory bit such as a flash memory bit that does not require battery backup to retain its contents across a power removal/loss event. In one embodiment, the secrets store 126 is implemented with a single memory bit that may be set or cleared. However, other embodiments may comprise a secrets store 126 having a different storage capacity and/or utilizing a different status encoding.

The chipset 104 may further protect the secrets store 126 from unauthorized updates. In one embodiment, chipset 104 comprises a processor interface 128 to decode transactions of the processor bus 106 and/or receive messages from the processors 102. The processors 102 may generate bus transactions and/or messages in response to executing one or more privileged instructions that request the chipset 104 to update the secrets store 126. The processor interface 128 may receive the bus transaction and/or messages and may update the secrets store 126 based upon the decoded bus transaction and/or messages. In one embodiment, valid execution of the privileged instructions is restricted to software executing at a particular processor privilege level. For example, in one embodiment valid execution of the privileged instructions is restricted to a monitor executing at the most privileged processor level. (See, FIG. 2).

The chipset 104 may further allow unprivileged updates of the secrets store 126. In one embodiment, the processors 102 in response to executing one or more privileged instructions may generate bus transactions and/or messages that the request the chipset 104 to allow unprivileged updates of the secrets store 126. Further, the processors 102 in response to executing one/or more unprivileged or privileged instructions may generate bus transactions and/or messages that request the chipset 104 to deny unprivileged updates of the secrets store 126. The processors 102 in response to executing one or more unprivileged instructions may generate bus transactions and/or messages that request the chipset 104 to update the secrets store 126. The processor interface 128 may receive the bus transactions and/or messages and may allow unprivileged updates, deny unprivileged updates, and/or update the secrets store 126 based upon the decoded bus transactions and/or messages. In one embodiment, valid execution of the privileged instructions to request unprivileged updates is restricted to software executing at a particular processor privilege level. For example, in one embodiment valid execution of these privileged instructions is restricted to a monitor executing at the most privileged processor level, thus allowing the monitor to grant selected non-privileged code (e.g. an AC module) write access to the secrets store 126.

The chipset 104 may further comprise a sleep controller 130, a sleep type store 132, and a sleep enable store 134. The sleep controller 130 in one embodiment selectively powers components and/or subcomponents based upon the sleep type store 132 and the sleep enable store 134. In one embodiment, a value may be stored in the sleep type store 132 to indicate into which sleep state (e.g. ACPI sleep states S1, S2, S3, S4) the sleep controller 130 is to place the computing device 100. The sleep enable store 134 may be updated to invoke entry into the sleep state indicated by the sleep state store 132. For example, the sleep enable store 134 may comprise a flag that in response to being set causes the sleep controller 130 to place the computing device 100 in the requested sleep state.

The chipset 104 may further comprise sleep attack detection logic 136 that detects probable sleep attacks. In one embodiment, a sleep method updates the secrets store 126 to indicate that the the system memory 108 contains no unencrypted secrets prior to updating the sleep enable store 134 to initiate the sleep entry process. Therefore, the sleep attack detection logic 136 in one embodiment determines that a sleep attack is probable in response to (i) the secrets store 126 indicating that the system memory 108 might contain unencrypted secrets and (ii) the sleep enable store 134 requesting that the sleep entry process be invoked. In response to detecting a probable sleep attack, the sleep attack detection logic 136 initiates a sleep attack response such as, for example, generating a system reset event, a system halt event, a system shutdown event, a system power off event, or some other response to protect the secrets stored in system memory 108.

In another embodiment, the sleep attack detection logic 136 further determines based upon the sleep state to be entered whether to invoke a sleep attack response. For example, circuitry used to protect secrets stored in the SE memory 122 may remain effective during a given sleep state. Accordingly, the sleep attack detection logic 136 may either decide that no sleep attack is occurring or may decide not to invoke a sleep attack response if the sleep type store 132 indicates a sleep state in which SE memory protections remain effective.

The chipset 104 may also support standard I/O operations on I/O buses such as peripheral component interconnect (PCI), accelerated graphics port (AGP), universal serial bus (USB), low pin count (LPC) bus, or any other kind of I/O bus (not shown). In particular, the chipset 104 may comprise a token interface 138 to connect chipset 104 with a token 110 that comprises one or more platform configuration registers (PCR) 140. In one embodiment, token interface 138 may comprise an LPC bus interface (LPC Interface Specification, Intel Corporation, rev. 1.0, 29 Dec. 1997).

In general, the token 110 may record metrics in a security enhanced manner, may quote metrics in a security enhanced manner, may seal secrets to a particular environment (current or future), and may unseal secrets to the environment to which they were sealed. The token 110 may comprise one or more keys 142 that may be used to support the above operations. The token keys 142 may include symmetric keys, asymmetric keys, and/or some other type of key. The token 110 may further comprise one or more platform configuration registers (PCR registers) 140 to record and report metrics in a security enhanced manner. In one embodiment, the token 110 supports a PCR extend operation that records a received metric in an identified PCR register 140 in a security enhanced manner.

The token 110 may also support a PCR quote operation that returns a quote or contents of an identified PCR register 140. The token 110 may further support a seal operation and an unseal operation. In response to a seal operation, the token 110 generates a sealed object comprising an object sealed to the token 110 and a specified device environment. Conversely, the token 110 may return an object of a sealed object in response to an unseal operation only if the object was sealed with a key of the token 110 and the current device environment satisfies environment criteria specified for the sealed object. In one embodiment, the token 110 may comprise a Trusted Platform Module (TPM) as described in the Trusted Computing Platform Alliance (TCPA) Main Specification, Version 1.1a, 1 Dec. 2001 or a variant thereof.

In an embodiment, the firmware 112 comprises Basic Input/Output System routines (BIOS) 144. The BIOS 144 may comprise AC modules, sleep code, wake code, system start-up code and/or structures. For example, the BIOS 144 may comprise ACPI structures and ACPI Source Language (ASL) code which may be accessed and/or executed during sleep event processing, wake event processing, and/or computing device initialization.

One embodiment of an SE environment 200 is shown in FIG. 2. The SE environment 200 may be initiated in response to various events such as, for example, system startup, an application request, an operating system request, etc. As shown, the SE environment 200 may comprise a trusted virtual machine kernel or monitor 202, one or more standard virtual machines (standard VMs) 204, and one or more trusted virtual machines (trusted VMs) 206. In one embodiment, the monitor 202 of the SE environment 200 executes in the protected mode at the most privileged processor ring (e.g. 0P) to manage security and provide barriers between the virtual machines 204, 206.

The standard VM 204 may comprise an operating system 208 that executes at the most privileged processor ring of the VMX mode (e.g. 0D), and one or more applications 210 that execute at a lower privileged processor ring of the VMX mode (e.g. 3D). Since the processor ring in which the monitor 202 executes is more privileged than the processor ring in which the operating system 208 executes, the operating system 208 does not have unfettered control of the computing device 100 but instead is subject to the control and restraints of the monitor 202. In particular, the monitor 202 may prevent the operating system 208 and its applications 210 from directly accessing the SE memory 122 and the token 110.

The monitor 202 may further comprise sleep logic 212 and one or more monitor keys 214 to encrypt and/or otherwise protect information. The sleep logic 212 comprises code to perform one or more sleep operations such as, for example, encrypting and attesting to memory contents. The monitor keys 214 may comprise symmetric cryptographic keys, asymmetric cryptographic keys, or other keys to which the monitor 202 has exclusive control. For example, the monitor keys 214 may comprise a symmetric root key and one or more asymmetric keys that are encrypted with the symmetric root key.

The monitor 202 may perform one or more measurements of the trusted kernel 216 such as a hash of the kernel code to obtain one or more metrics, may cause the token 110 to extend a PCR register 140 with the metrics of the kernel 216, and may record the metrics in an associated PCR log stored in SE memory 122. The monitor 202 may further establish the trusted VM 206 in SE memory 122 and launch the trusted kernel 216 in the established trusted VM 206.

Similarly, the trusted kernel 216 may take one or more measurements of an applet or application 218 such as a hash of the applet code to obtain one or more metrics. The trusted kernel 216 via the monitor 202 may then cause the physical token 110 to extend a PCR register 140 with the metrics of the applet 218. The trusted kernel 216 may further record the metrics in an associated PCR log stored in SE memory 122. Further, the trusted kernel 216 may launch the trusted applet 218 in the established trusted VM 206 of the SE memory 122.

In response to initiating the SE environment 200 of FIG. 2, the computing device 100 further records metrics of the monitor 202 and hardware components of the computing device 100 in one or more PCR registers 140 of the token 110. For example, the processor 102 may obtain hardware identifiers such as, for example, processor family, processor version, processor microcode version, chipset version, and physical token version of the processors 102, chipset 104, and physical token 110. The processor 102 may then record the obtained hardware identifiers in one or more PCR registers 140.

Figure 3:
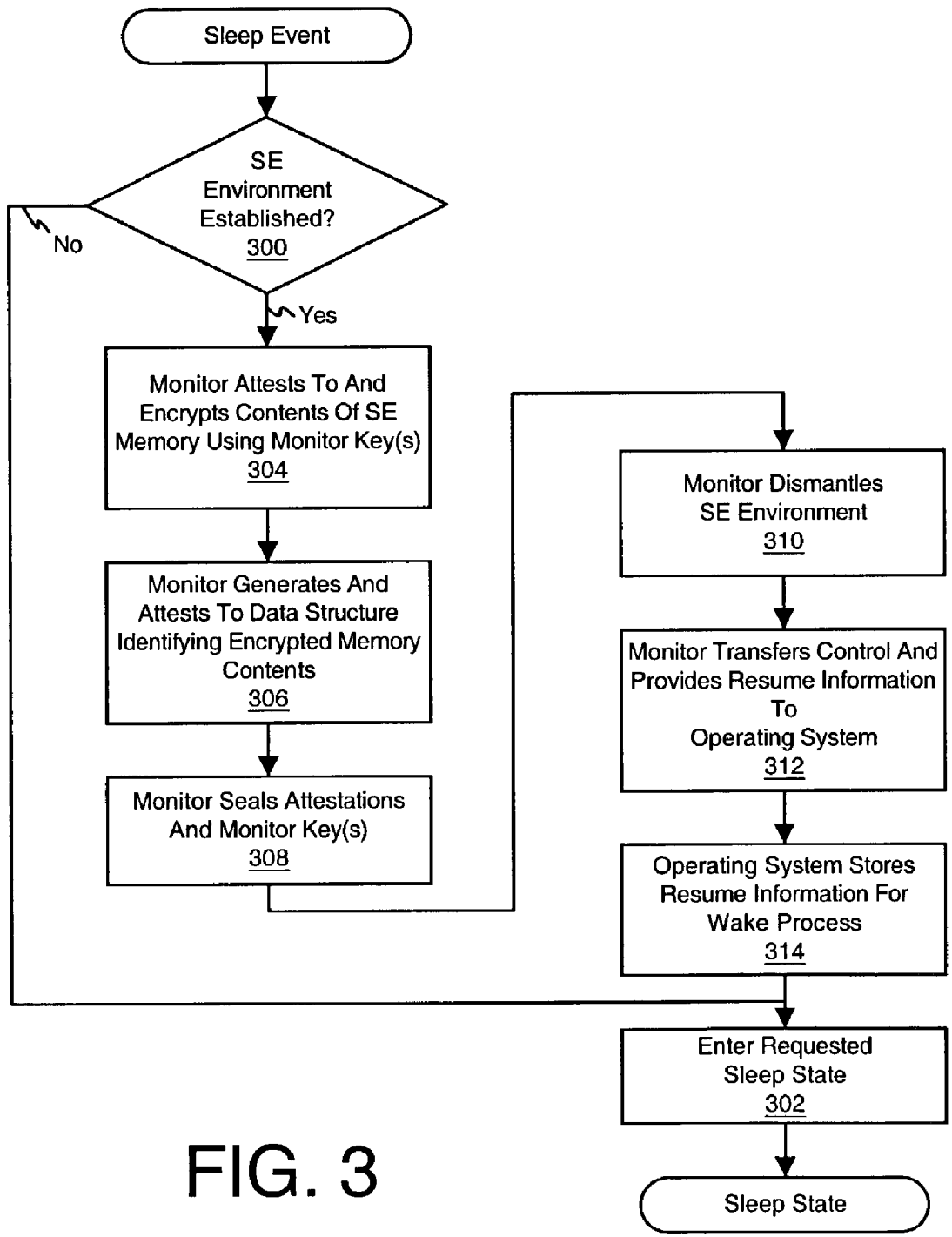
FIG. 3 illustrates an embodiment of a sleep method of the computing device of FIG. 1.

Referring now to FIG. 3, an embodiment of a method to enter a sleep state is illustrated. The computing device 100 may perform the method in response to a sleep event. For example, a sleep event may be generated in response to a device and/or an operating system detecting that a device has remained idle for a predetermined length of time. In response to the sleep event, the operating system 208 may determine in block 300 whether an SE environment 200 is currently established. In response to determining that no SE environment 200 is established, the computing device 100 in block 302 may invoke a sleep entry process (described in more detail below) to place the computing device 100 into a requested sleep state.

In response to determining that an SE environment 200 is established, the request, the monitor 202 in block 304 may encrypt and attest to the contents of the SE memory 122. In one embodiment, the monitor 202 encrypts the pages of the SE memory 122 using one of the monitor keys 214 and replaces the pages with encrypted pages. The monitor 202 may leave portions of the SE memory 122 that contain the monitor 202 or the portions of the SE memory 122 that contain the sleep logic 212 of the monitor 202 unencrypted so that processors 102 may continue to execute the sleep logic 212.

The monitor 202 in block 304 may further attest to the contents of the SE memory 122. In one embodiment, the monitor 202 may generate a contents attestation by hashing the encrypted contents of the SE memory 122 to obtain a memory hash. In another embodiment, the monitor 202 may generate the contents attestation by hashing only the pages that will remain in the SE memory 122 after the wake process. For example, the wake process may reload the monitor 202 and/or other code from non-volatile storage 114. Since these portions of the SE memory 122 are reloaded, the computing device 100 may erase these portions from system memory 108 and/or may not save them to non-volatile storage 114 prior to entering the sleep state. In another embodiment, the monitor 202 may attest to the contents of the SE memory 122 by embedding a content attestation such as, for example, a watermark, signature, and/or other information in the attested contents of the SE memory 122.

In block 306, the monitor 202 may generate and attest to a data structure (e.g. a page table, page list, segment list, region list, etc.) that identifies pages/segments/regions of system memory 122 encrypted in block 304. In one embodiment, the monitor 202 may generate a data structure attestation by hashing the data structure to obtain a data structure hash. In another embodiment, the monitor 202 may attest to the data structure by embedding a data structure attestation such as, for example, a watermark, signature, and/or other information in the attested data structure.

The monitor 202 in block 308 may seal the content attestation, the data structure attestation, and/or the monitor keys 214 to protect them from unauthorized access and/or alteration. In one embodiment, the monitor 202 seals the content attestation, the data structure attestation, and the monitor keys 214 via one or more seal operations of the token 110 to obtain one or more sealed resume objects. In one embodiment, the seal operations use a PCR register 140 containing a metric of the monitor 202 to effectively prevent another monitor such as, for example, a rogue monitor from accessing and/or altering the unencrypted contents of the sealed resume objects.

In block 310, the monitor 202 dismantles the SE environment 200. The monitor 202 may perform various operations as part of the dismantling process. In one embodiment, the monitor 202 updates the secrets store 126 to indicate that the system memory 108 does not contain unencrypted secrets. For example, the monitor 202 may clear a flag of the secrets store 126 to indicate the system memory 108 does not contain unencrypted secrets. Further, the monitor 202 may shutdown the trusted virtual machines 206 and may exit the VMX processor mode. The monitor 202 may further erase regions of the system memory 108 that will be reloaded from non-volatile storage 114 during the wake process.

In block 312, the computing device 100 may cease execution of the monitor 202 and return to execution of the operating system 208. In one embodiment, as a result of returning to the operating system 208, the monitor 202 provides the operating system 208 with SE environment resume information that identifies the location and size of the monitor 202 to be executed in response to waking and the location and size of the sealed resume objects. However, the computing device 100 may utilize other mechanisms to enable the operating system 208 to retrieve the monitor 202 and sealed resume objects during the wake process. For example, the monitor 202 and/or sealed resume objects may be stored at predetermined locations or at locations set by the BIOS 144.

The operating system 208 in block 314 may save the resume information so that it may be retrieved as part of the wake process. The operating system 208 may store the SE environment resume information at predetermined locations of the system memory 108, at locations set by the BIOS 144, non-volatile registers of the chipset 104, and/or other locations. In one embodiment, the monitor 202 in block 312 stores the information at the appropriate locations, thus relieving the operating system 208 of saving the information in block 314.

The operating system 208 and/or the BIOS 144 in block 302 may complete the sleep entry process. For example, the operating system 208 and/or the BIOS 144 may write a sleep type identifier to the sleep type store 132 to indicate which sleep state the computing device 100 is entering and may update the sleep enable store 134 to invoke entry into the sleep state. In one embodiment, the operating system 208 and/or BIOS 144 may cause the computing device 100 to enter a sleep state that is different than the sleep state requested. The operating system 208 and/or BIOS 144 may elect to change the sleep state for various reasons such as, for example, one or more components of the computing device 100 not supporting the requested sleep state. In response to updating the sleep type store 132 and sleep enable stores 134, the sleep controller 130 may cause the computing device 100 to enter the sleep state and may complete the sleep process. For example, the sleep controller 130 may remove power from components and/or subcomponents of the computing devices 100, may request components and/or subcomponents to enter a low power mode of operation, and/or may cause the contents of system memory 108 to be written to non-volatile storage 114.

Figure 4:
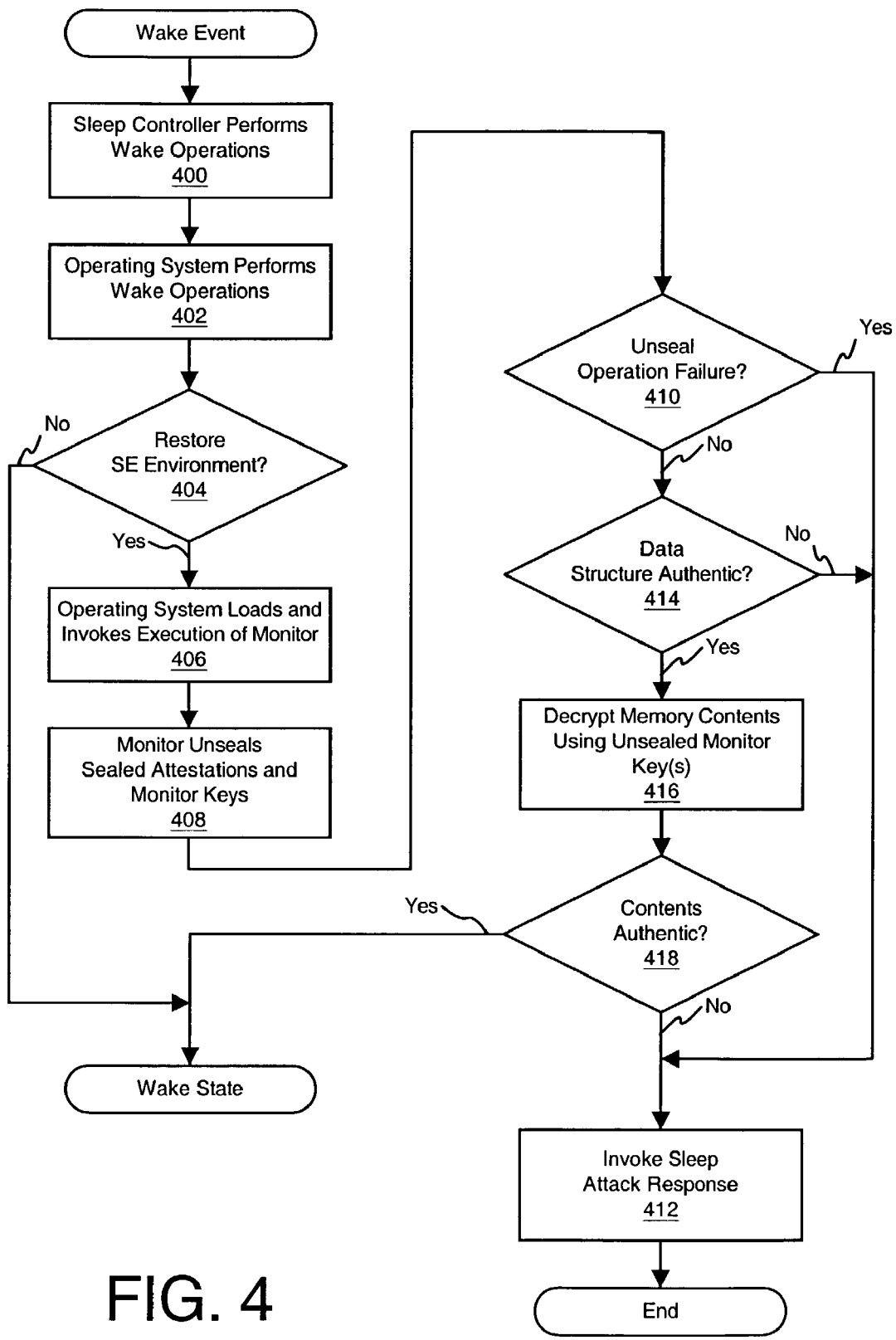
FIG. 4 illustrates an embodiment of a wake method of the computing device of FIG. 1.

Referring now to FIG. 4, a method of waking from a sleep state is illustrated. The computing device 100 may perform the wake method in response to a wake event. A wake event may be generated in response various stimuli such as, for example, a modem detecting a ring event, a network controller detecting network activity, a keyboard controller detecting a key press, etc. In response to the wake event, the sleep controller 130 in block 400 may perform one or more wake operations such as, for example, waking the processors 102 and transferring saved state information from the non-volatile storage 114 to the system memory 108. The sleep controller 130 in one embodiment may perform one or more of the wake operations in response to executing ASL and/or other code of the BIOS 144. After performing the wake operations, the sleep controller 130 may transfer control to the operating system 208. In one embodiment, the sleep logic 212 invokes execution of the operating system 208 from a location identified by a wake vector.

The operating system 208 in block 402 may perform one or more wake operations, such as, waking network controllers, modems, and/or other devices of the computing device 100. In block 404, the operating system 208 determines whether to restore an SE environment 200 based upon stored resume information and/or the lack of stored resume information. In response to determining to restore the SE environment 200, the operating system 208 performs various operations. For example, the operating system 208 may load, authenticate, and initiate execution of AC modules that configure the computing device 100 and/or verify the configuration of the computing device 100. Further, the operating system 208 in block 406 may load and invoke execution of the monitor 202 identified by the resume information.

In block 408, the monitor 202 may unseal the sealed resume objects to obtain the contents attestation, the data structure attestation, and the monitor keys 214 via one or more unseal operations of the token 110. In response to detecting that the unseal operation failed (block 410), the monitor 202 in block 412 invokes a sleep attack response to address a probable sleep attack. In one embodiment, the monitor 202 invokes the sleep attack response by writing to a reset register of the chipset 104 to invoke a system reset. However, the monitor 202 may respond in other ways such as, for example, halting the processors 102, erasing system memory 108, invoking a system shutdown, removing power from the computing device 100, and/or other actions that protect the secrets from unauthorized access and/or alteration.

In block 414, the monitor 202 verifies the authenticity of the data structure base upon the data structure attestation. In one embodiment, the monitor 202 hashes the data structure to obtain a computed data structure attestation. The monitor 202 further compares the computed data structure attestation to the data structure attestation obtained from the sealed resume objects and determines that the data structure is authentic in response to the computed attestation having a predetermined relationship (e.g. equal) to the unsealed attestation. In response to determining that the data structure may not be authentic and by be altered, the monitor 202 in block 412 invokes a sleep attack response to address the probable sleep attack.

The monitor 202 in block 416 may decrypt portions of system memory 108 and store the decrypted portions in SE memory 122. The monitor 202 may decrypt the portions of the system memory 108 identified by the data structure using one or more unsealed monitor keys 214. In block 418, the monitor 202 may verify the authenticity of the encrypted or decrypted SE memory contents. In one embodiment, the monitor 202 may hash the decrypted contents added to the SE memory 122 to obtain a computed contents attestation. In another embodiment, the monitor 202 may hash the encrypted contents to be added to the SE memory 122 to obtain a computed contents attestation. The monitor 202 may further compare the computed contents attestation to the unsealed contents attestation and may determine that the contents are authentic (e.g. unaltered) in response to the computed attestation having a predetermined relationship (e.g. equal) to the unsealed attestation. In response to determining that the contents are not authentic (e.g. altered), the monitor 202 in block 412 may invoke an attack response to the probable sleep attack. Conversely, in response to determining that the contents are authentic, the monitor 202 completes the wake process by invoking execution of the operating system 208.

The above embodiments of the sleep and wake methods help protect secrets from attack. However, an attacker may attempt to circumvent the sleeping method of FIG. 3 to place the computing device 100 in a sleep state in which unencrypted secrets reside in system memory 108 and/or non-volatile storage 114 unprotected. To protect against such circumvention, the sleep attack detection logic 136 may invoke a system reset event or another attack response in response to detecting a probable sleep attack. In one embodiment of the sleep method of FIG. 3, the monitor 202 updates the secrets store 126 to indicate that the system memory 108 contains no unencrypted secrets prior to updating the sleep enable store 134 to initiate the sleep entry process. Accordingly, the sleep attack detection logic 136 may invoke a sleep attack response in response to the sleep enable store 134 being updated if the secrets store 420 indicates that the system memory 108 might contain unencrypted secrets.

In another embodiment of the sleep method of FIG. 3, the monitor 202 encrypts the SE memory 122 and updates the secrets store 126 to indicate that the system memory 108 contains no unencrypted secrets only if the requested sleep state would result in the SE memory 122 being unprotected. Accordingly, sleep attack detection logic 136 may invoke a sleep attack response in response to the sleep enable store 134 being updated if the secrets store 420 indicates that the system memory 108 might contain unencrypted secrets and the sleep type store 132 indicates a sleep state in which the SE memory 122 map be unprotected.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   storing unencrypted secrets in a memory of a system;
   setting a first flag in a secrets store to indicate that the memory contains unencrypted secrets;
   setting a second flag in a sleep enable store to request a sleep controller to cause the system to enter one of a plurality of sleep states by powering down at least one of a plurality of system components;
   determining which of the plurality of sleep states to enter based on a sleep type store, wherein the type of sleep state determines which of the plurality of system components to power down and the wake-up latency of the system;
   detecting a sleep attack,
   determining that the memory contains unencrypted secrets based on the secrets store; and
   before entering a sleep state, in response to determining that the memory contains unencrypted secrets based on the secrets store, invoking a sleep attack response that protects the unencrypted secrets from the sleep attack, the sleep attack response including one or more from the group of generating a system reset event, generating a system halt event, generating a system shutdown event, generating a system power off event, powering circuitry used to protect the unencrypted secrets during the sleep state, or erasing the memory.

2. The method of claim 1 wherein setting the second flag in the sleep enable store is in response to a sleep event.

3. The method of claim 1 further comprising encrypting one or more portions of the memory in response to a sleep event.

4. The method of claim 3 further comprising generating a contents attestation that attests to the one or more portions of the memory.

5. The method of claim 3 further comprising generating a structure that identifies the one or more portions of the memory; and
generating one or more attestations that attest to the structure and the one or more portions of the memory.

6. The method of claim 5 further comprising sealing the structure and the one or more attestations to a monitor of a computing device.

7. A chipset to support a processor in a system, comprising a secrets store to indicate whether a memory in the system contains unencrypted secrets;
a sleep controller;
a sleep enable store to request the sleep controller to cause the system to enter one of a plurality of sleep states by powering down at least one of a plurality of system components;
a sleep type store to indicate which of the plurality of sleep states to enter, wherein the indication determines which of the plurality of system components to power down and the wake-up latency of the system;
sleep attack detection logic to detect a sleep attack and determine that the memory contains secrets based on the secrets store, in response to a request from the processor to enter the sleep state and to invoke an attack response before entering the sleep state, where the sleep attack response includes one or more from the group of generating a system reset event, generating a system halt event, generating a system shutdown event, generating a system power off event, powering circuitry used to protect the unencrypted secrets during the sleep state, or erasing the memory.

8. The chipset of claim 7 further comprising an interface that prevents untrusted modification of the secrets store.

9. The chipset of claim 7 further comprising an interface that requires receipt of one or more messages prior to allowing updates to the secrets store.

10. A system comprising an operating system and a more privileged monitor,
the operating system to
store unencrypted secrets in system memory;
receive a first flag in a secrets store to indicate the memory contains unencrypted secrets;
receive a second flag in a sleep enable store to request a sleep controller, to enter a sleep state by powering down at least one of a plurality of system components based on the sleep state type,
determine which of the plurality of sleep states to enter based on a sleep type store, wherein the type of sleep state determines which of the plurality of system components to power down and the wake-up latency of the system, and to transfer processing of the sleep event to the monitor, and
the monitor, based on a secrets store that indicates whether a memory contains unencrypted secrets and in response to the sleep event and before the system enters the sleep state, to encrypt one or more pages of the memory and to indicate that the memory contains no unencrypted secrets.

11. The system of claim 10, wherein the monitor is to further update the secrets store to indicate that the memory contains no unencrypted secrets.

12. The system of claim 10, wherein
the monitor is to return processing of the sleep event to the operating system, and
the operating system is to write encrypted and non-encrypted pages of memory to non-volatile storage.

13. The system of claim 10, wherein
the monitor is to return processing of the sleep event to the operating system, and
the operating system is to cause the system to enter the sleep state.

14. The system of claim 10, wherein the monitor is to further generate a contents attestation that attests to the encrypted pages of the memory.

15. The system of claim 14, wherein the monitor is to further generate a structure that identifies the encrypted pages, and is to generate a structure attestation that attests to the structure.

16. The system of claim 15, wherein the monitor is to further seal to the monitor the contents attestation, the structure attestation, and a monitor key to decrypt the encrypted pages.

17. A system comprising
volatile memory comprising security enhanced regions,
a secrets store to indicate whether the volatile memory contains unencrypted secrets,
a sleep controller;
a sleep enable store to request the sleep controller, in response to a sleep event, to cause the system to enter one of a plurality of sleep states by powering down at least one of a plurality of system components;
a sleep type store to indicate which of the plurality of sleep states to enter, wherein the indication determines which of the plurality of system components to power down and the wake-up latency of the system;
sleep attack detection logic to invoke a sleep attack response before entry into the sleep state, in response to the sleep enable store being updated to invoke entry into the sleep state and the secrets store indicating that the volatile memory contains unencrypted secrets, where the sleep attack response includes one or more from the group of:
generating a system reset event,
generating a system halt event,
generating a system shutdown event,
generating a system power off event,
powering circuitry used to protect the unencrypted secrets during the sleep state such as a processor to encrypt the security enhanced regions in response to the sleep event and to update the secrets store to indicate that the volatile memory contains no unencrypted secrets in response to encrypting the security enhanced regions,
or erasing the memory.

18. The system of claim 17, wherein the processor is to further generate a contents attestation that attests to the security enhanced regions and is to invoke the sleep attack response in response to a wake event if the contents attestation indicates that the security enhanced regions are not authentic.

19. The system of claim 18, wherein the processor is to further seal the contents attestation and a key to decrypt the security enhanced regions to the system.

20. The system of claim 19, wherein the processor is to further invoke the sleep attack response in response to a wake event if unsealing the contents attestation and the key fails.

21. A machine-readable medium comprising a plurality of instructions that in response to being executed, result in a system setting a first flag in a secrets store to indicate that the memory contains unencrypted secrets;

in response to a sleep event, setting a second flag in a sleep enable store to request a sleep controller to cause the system to enter one of a plurality of sleep states by powering down at least one of a plurality of system components;

determining which of the plurality of sleep states to enter based on a sleep type store, wherein the type of sleep state determines which of the plurality of system components to power down and the wake-up latency of the system;

detecting a sleep attack;

determining that the memory contains unencrypted secrets based on the secrets store;

before entering the sleep state, in response to determining that the memory contains unencrypted secrets based on the secrets store, encrypting contents of the memory, and generating a contents attestation that attests to the contents of the memory.

22. The machine-readable medium of claim 21 wherein the plurality of instructions in response to being executed further result in the system using the contents attestation to verify the authenticity of the contents in response to a wake event, and invoking a sleep attack response in response to determining that the contents of the memory are not authentic.

23. The machine-readable medium of claim 22 wherein the plurality of instructions in response to being executed further result in the system sealing the contents attestation and a key to decrypt the contents of the memory to the system in response to the sleep event, unsealing the contents attestation and the key in response to a wake event, and invoking the sleep attack response in response to a failure in unsealing the contents attestation and the key.

* * * * *